United States Patent

Degroot, Jr. et al.

(10) Patent No.: US 7,471,856 B2
(45) Date of Patent: Dec. 30, 2008

(54) SHORT REACH OPTICAL INTERCONNECT

(75) Inventors: Jon Degroot, Jr., Midland, MI (US); Shedric Glover, Midland, MI (US); William K. Bischel, Menlo Park, CA (US); Mark J. Dyer, San Jose, CA (US)

(73) Assignees: Dow Corning Corporation, Midland, MI (US); Gemfire Corporation, Fremont, CA (US)

( * ) Notice: Subject to any disclaimer, the term of this patent is extended or adjusted under 35 U.S.C. 154(b) by 0 days.

(21) Appl. No.: 11/630,011

(22) PCT Filed: Jul. 8, 2005

(86) PCT No.: PCT/US2005/024231

§ 371 (c)(1),
(2), (4) Date: Sep. 10, 2007

(87) PCT Pub. No.: WO2006/014582

PCT Pub. Date: Feb. 9, 2006

(65) Prior Publication Data

US 2008/0044133 A1    Feb. 21, 2008

Related U.S. Application Data

(60) Provisional application No. 60/586,257, filed on Jul. 8, 2004.

(51) Int. Cl.
*G02B 6/12* (2006.01)
(52) U.S. Cl. .......................... 385/14; 385/129
(58) Field of Classification Search ............... 385/14, 385/129
See application file for complete search history.

(56) References Cited

U.S. PATENT DOCUMENTS

| | | |
|---|---|---|
| 2,892,716 A | 6/1959 | Martin |
| 5,861,467 A | 1/1999 | Bujanowski et al. |
| 6,343,164 B1 | 1/2002 | Robertsson et al. |
| 6,519,380 B2 | 2/2003 | Dawes et al. |
| 7,112,885 B2 * | 9/2006 | Chen et al. ............ 257/728 |
| 2003/0175004 A1 * | 9/2003 | Garito et al. ............ 385/143 |
| 2004/0095658 A1 | 5/2004 | Buretea et al. |

* cited by examiner

*Primary Examiner*—Jennifer Doan
(74) *Attorney, Agent, or Firm*—Dinsmore & Shohl LLP

(57) ABSTRACT

An optical link includes a polymer waveguide having a top cladding layer, a core polymer layer, and a bottom cladding layer, supported by a substrate, with mirrors and optical vias. The core polymer layer includes a polymer material having a nanoparticle filler with a particle size of less than one tenth the shortest wavelength of interest for the optical link. The optical links comprise individual, multiple or massively parallel channels in single or multilayer networks.

29 Claims, 4 Drawing Sheets

SHORT REACH OPTICAL INTERCONNECT

RELATED APPLICATIONS

This application claims priority of U.S. Provisional Patent Applications Ser. No. 60/586,257 filed Jul. 8, 2004 which is incorporated herein by reference.

FIELD OF THE INVENTION

The invention relates to methods and materials for forming optical interconnect structures.

BACKGROUND OF THE INVENTION

Systems including optical interconnect devices are often used to transmit information at high data rates. For example, such systems are used for board-to-board, backplane, local area network (LAN), wide area network (WAN) and similar applications. Optical systems have advantages when compared to electrical interconnect systems. Optical systems are generally less susceptible to electromagnetic interference resulting in increased transfer efficiencies.

Short reach (<2 meters) optical interconnects for chip-to-chip and board-to-board optical communications have been under development for more than 10 years, primarily funded by the US Department of Defense. The need for these optical interconnects is driven by the bandwidth, security, reliability, and size requirements of the next (and future) generation computers and telecommunication systems. With internal clock speeds approaching 3 GHz today and projected to be 5 GHz in the next few years, the bottleneck limiting the speed of future computer systems is the data transfer step from a source computer processor chip and routed to other computer processors, DSPs, and data storage devices at equivalent or higher data rates than the clock speed.

There have been many technologies developed to solve this interconnect bottleneck, including optical interconnects. Typical optical interconnect systems generally include a light emitting device, such as a laser transmitter and a light detecting device, such as a photodiode linked by a waveguide material. Costs associated with the production of optical interconnect systems are high due to the complex manufacturing methods utilized. There is therefore a need in the art for a cost effective method of fabricating a waveguide optical light path, or optical link, that will guide light from the transmitter to the receiver that can be embedded into a standard printed wiring board (PWB) fabrication process, or embedded into a flex circuit.

There is a need for a multimode optical link that can connect any two points on the surface of a substrate, preferably a printed wiring board (PWB). Such an optical link requires a fabrication process for multi mode polymer waveguides that can be cost effectively scaled to large area substrates, including glass and a variety of rigid and flexible PWB board compositions, such as glass fiber-resin (FR4) and polyimide. The multimode waveguides are then combined with out-of-plane mirrors to create the optical link. Several different techniques have been used in the past to fabricate out-of-plane mirrors in polymer waveguides including laser ablation, reactive ion etching (RIE), a microtome process, molding, and glass insertion devices. All of these previous techniques have either required costly tools to implement the process, or created mirrors with high loss such that the techniques could not be applied to a commercially viable process. The out-of-plane mirrors and waveguide should be robust enough to survive the temperature, pressure, and chemical environment required by the PWB fabrication process.

SUMMARY OF THE INVENTION

An optical link includes a polymer waveguide having a top cladding layer, a core polymer layer, and a bottom cladding layer on a PWB or other support substrate. An optical link is completed on one or both ends of the waveguide by out-of-plane mirrors and vias to facilitate light passage through the board. The optical links comprise individual, multiple or massively parallel channels in single or multilayer networks. The core, cladding, or both polymer layers preferably include a siloxane polymer material having a nanoparticle filler with a particle size of less than one tenth the shortest wavelength of interest for the optical link.

Also disclosed is a process for producing an optical link comprising the steps of: forming a polymer waveguide having a top cladding layer, a core polymer layer, and a bottom cladding layer, the core, cladding or both polymer layers comprising a polymer material having a nanoparticle filler with a particle size of less than one tenth the shortest wavelength of interest for the optical link using a printing process.

DETAILED DESCRIPTION OF PREFERRED EMBODIMENTS

Figure 1:
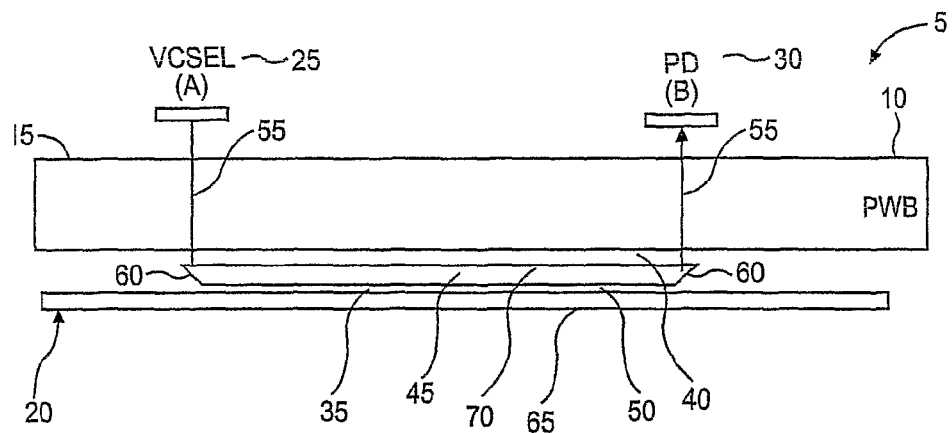
FIG. 1 is a graphical representation of a waveguide and printed circuit board in accordance with the present invention.

Referring to FIG. 1, there is shown an optical link 5 in accordance with the present invention. A printed wiring board (PWB) 10 having an electrical layer 15 and an optical layer 20 is shown. A light source 25 and light receiver 30 are mounted to the top electrical surface 15 of the PWB 10. The light source and light receiver 25, 30 are connected to high-speed electronics on the top electrical layer 15 of the PWB 10. The optical link 5 connects the light source and light receiver 25, 30 allowing data to be transferred from the light source to the receiver.

The optical link 5 comprises a polymer waveguide 35 including a top cladding layer 40, a core polymer layer 45, and a lower cladding layer 50. In a preferred aspect of the present invention, the index of refraction of the core polymer layer 45 is from 0.5 to 5% larger than the upper and lower cladding layers 40, 50. The waveguide 35 connects the light source to the light receiver 25, 30 through vias or interlayer conductive paths 55 formed in the PWB 10. As can be seen from FIG. 1, the light source and light receiver 25, 30 are attached to the top electrical layer 15 of the PWB 10 above the vias 55 connecting to the waveguide 35.

The waveguide 35 includes mirrors 60, out of plane as shown, for coupling the waveguide optical signal to electrical components on the electrical layer of the PWB. In a preferred aspect, the mirrors 60 comprise total internal reflection (TIR) mirrors having an approximate 45° angle or smaller relative to the waveguide 35. The mirrors 60 are integrally formed with the waveguide 35 at opposing ends, and are associated with the vias 55 discussed above. The waveguide 35 preferably has thickness dimensions ranging up to 100 microns with a preferable square cross section, although other cross sections and thicknesses of the waveguide 35 may be utilized by the present invention. The waveguide 35 may also include an optional protective polymer coating 65 formed on a bottom surface 70 of the waveguide 35 for protecting the waveguide 35 from external magnetic sources, as well as damage due to contact.

Figure 4:
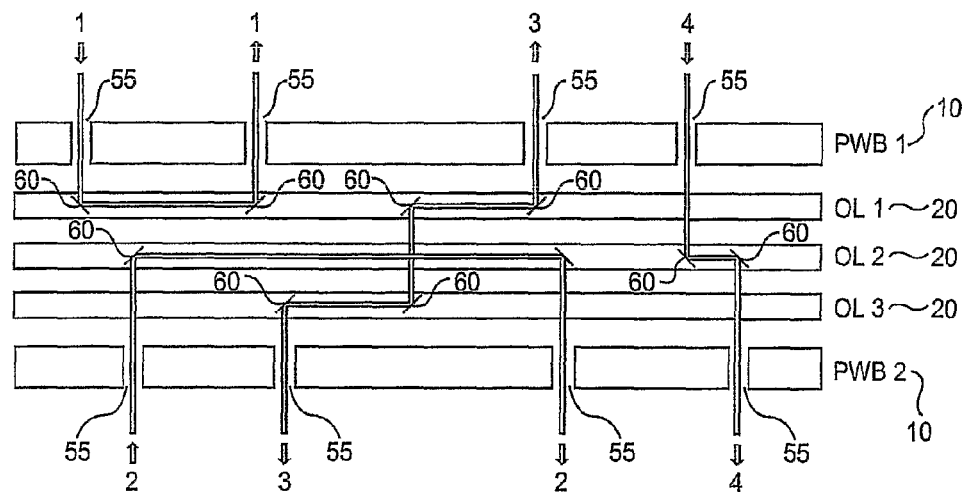
FIG. 4 is a graphical representation of the cross section of a multilayer configuration with several optical waveguide link paths (1-4) among multiple levels, with in-plane and adjacent-plane waveguide crossings in accordance with the present invention.

Referring to FIG. 4 there is shown an alternative embodiment of the optical link 5 having multiple optical layers 20. Several optical layers (OL1, OL2, OL3) 20 with mirrors 60 and vias 55 are sandwiched in this embodiment between two printed wiring boards (PWB1, PWB2) 10. The arrows indicate possible paths, including inter- and intralayer crossings, of light travel from modulated light emitters to photosensitive detectors mounted on either side or within the board stack.

Figure 5:
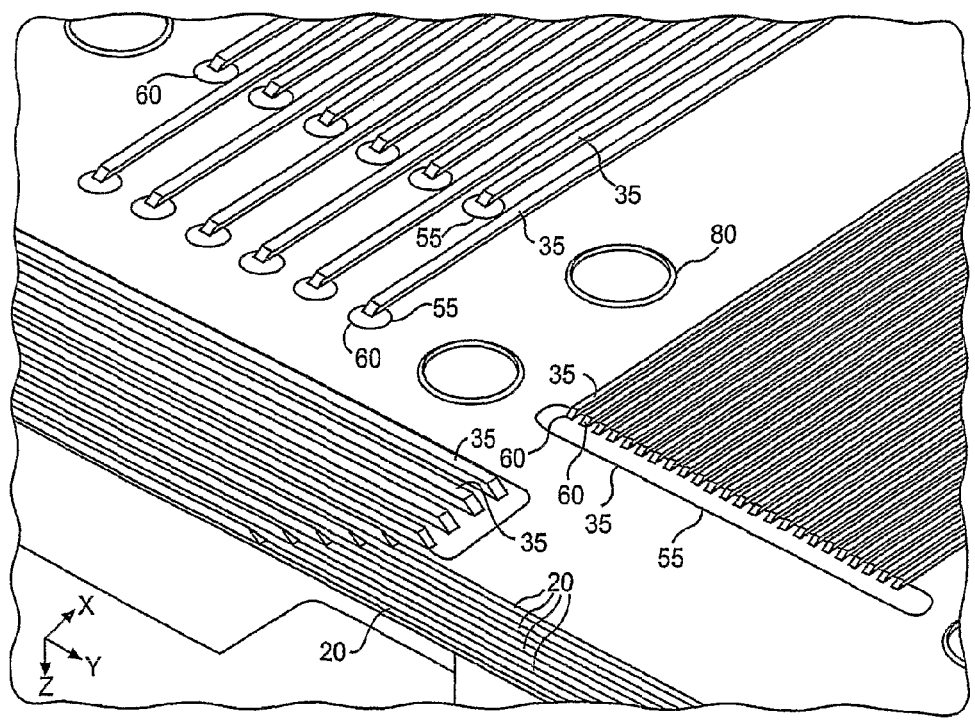
FIG. 5 is a three-dimensional graphical representation of several optical waveguide arrays comprising multiple links of various sizes in staggered, high-density, and 3-dimensional geometries.

Referring to FIG. 5, there are shown additional embodiments of the optical link 5 of the present invention. In the foreground of this depiction, 4 optical links 5 are shown arrayed along the X direction on the top layer. A cross-section of this 3-dimensional array is cut at the 4th optical link 5 to show 6 waveguide 35 layers beneath. The out-of-plane mirrors 60 of this array are staggered in position along the Y-direction to create a 2-D array of 24 waveguides 35 as viewed along the Z direction. Shown at the upper left is a bundle of 12 waveguides 35 having alternating staggered mirrors 60 and individual vias 55. At the right of the figure is shown a high density linear array of 24 waveguides 35 ending in out-of-plane mirrors 60 over a slotted via 55. Precision alignment holes or pins 80 allow passive alignment of optoelectronic elements. Each link is supported by a substrate 10 or adjacent layers, and possesses a waveguide 35, vias 55 and mirrors 60 in accordance with the present invention.

The core polymer layer 45 of the waveguide 35 of the present invention comprises organic and inorganic polymers that have a high thermal decomposition temperature and resistance to corrosive solvents. Particularly preferred polymers include inorganic compositions comprising siloxanes. Even more preferred polymers are siloxane polymer-nanoparticle hybrid material systems. Such polymers are robust enough to survive the temperature, pressure, and chemical environment required by a PWB fabrication process and provide the requisite low loss.

The polymer-nanoparticle hybrid preferably comprises siloxane polymers that are curable and contain functional groups such as epoxy, vinylether, vinylester, vinyl, olephinic, and acrylates. Additional materials including appropriate catalysts and cross linkers that are commonly known in the art may also be included in the core polymer of the present invention.

Preferably, the core polymer of the present invention is photo curable. Particularly preferred cationic photo curable polymers are disclosed in U.S. Pat. No. 5,861,467, which is herein incorporated by reference. The cationic photo cured polymer is directed to a curable coating composition comprising (A) a siloxane copolymer and (B) a photocleavable acid. Suitable photocleavable acids for the compositions of the present invention include onium salts and certain nitrobenzyl sulfonate esters. Preferred for the compositions of this invention are onium salts having the formulae $R_2I^+ MX_n^-$, $R_3S^+MX_n^-$, $R_3Se^+MX_n^-$, $R_4P^+MX_n^-$, and $R_4N^+ MX_n^-$, wherein R is the same or different organic radicals having from 1 to 30 carbon atoms, including aromatic carbocyclic radicals of from 6 to 20 carbon atoms which can be substituted with from 1 to 4 monovalent hydrocarbon radicals selected from alkoxy radicals having from 1 to 8 carbon atoms, alkyl radicals having from 1 to 8 carbon atoms, nitro, chloro, bromo, cyano, carboxy, mercapto, and aromatic heterocyclic radicals including pyridyl, thiophenyl, pyranyl, etc. The symbol M in the formulae hereinabove are metals or metalloids which include transition metals such as such as Sb, Fe, Sn, Bi, Al, Ga, In, Ti, Zr, Sc, V, Cr, Mn, Cs, rare earth metals such as the lanthanides, for example, Cd, Pr, Nd, etc., and metalloids such as B, P, As, etc. $MX_n^-$ is a non-basic, non-nucleophilic anion, such as $BF_4^-$, $PF_6^-$, $AsF_6^-$, $SbF_6^-$, $SbCl_6^-$, $HSO_4^-$, $ClO_4^-$, $FeCl_4^=$, $SnCl_6^-$, $BiCl_5^=$, and the like.

Bis-diaryl iodonium salts, such as bis(dodecyl phenyl)iodonium hexafluoroarsenate and bis(dodecylphenyl)iodonium hexafluoroantimonate, dialkylphenyl iodonium hexafluoroantimonate, and Iodonium perfluorophenyl borate are preferred.

Nitrobenzyl sulfonate esters which are useful as photocleavable acids in the compositions of the present invention have the general formula:

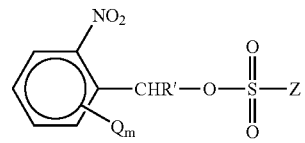

wherein Z is selected from the group consisting of alkyl groups, aryl groups, alkylaryl groups, halogen substituted alkyl groups, halogen substituted aryl groups, halogen substituted alkylaryl groups, nitro substituted aryl groups, nitro substituted alkylaryl groups, aryl groups having nitro and halogen substituents, alkylaryl groups having nitro and halogen substituents, and a group having the formula $C_6 H_4 SO_3 CHR'C_6 H_{4-m} Q_m (NO)_2$, R' is selected from the group consisting of hydrogen, methyl, and nitro substituted aryl groups, each Q is independently selected from the group consisting of hydrocarbon groups, hydrocarbonoxy groups, $NO_2$, halogen atoms, and organosilicon compounds, m has a value of 0, 1, or 2, with the proviso that Q is not an acidic group.

In addition to the cationic photo curable polymers outlined above, free radical photo curable polymers such as those disclosed in U.S. Pat. No. 2,892,716 which is herein incorporated by reference may also be utilized by the present invention. The free radical polymers of the present invention include: acrylic, methacrylic, sulfide, vinyl keto, vinyl acetate and unsaturated polyimide based polymers.

In addition to the photo curable polymers outlined above, thermally curable polymers may also be utilized by the present invention. Thermally curable systems may use a platinum catalyst with a silicon hydride component or a peroxide catalyzed system that may or may not include silicon hydride functionalities. A preferred thermally curable polymer comprises at least one organopolysiloxane having an average of at least two reactive functional groups per molecule, a number-average molecular weight of up to 80,000, and an average from 0 to 90 mol % of silicon-bonded phenyl groups per molecule. The organopolysiloxane can have a linear or branched structure. The organopolysiloxane can be a homopolymer or a copolymer. The reactive groups can be alkenyl groups typically having from 2 to 10 carbon atoms, alternatively from 2 to 6 carbon atoms. The alkenyl groups in the organopolysiloxane can be located at terminal, pendant, or both terminal and pendant positions. Examples of alkenyl groups include, but are not limited to, vinyl, allyl, butenyl, and hexenyl. Alternatively, the reactive groups can contain epoxy, carbinol or silanol functionalities.

The remaining silicon-bonded organic groups (other than the reactive groups) in the organopolysiloxane are independently selected from hydrocarbyl and halogen-substituted hydrocarbyl, both free of aliphatic unsaturation. These monovalent groups typically have from 1 to 20 carbon atoms, alternatively from 1 to 10 carbon atoms, alternatively from 1 to 6 carbon atoms. Examples of hydrocarbyl groups include, but are not limited to, alkyl, such as methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, octyl, nonyl, decyl, undecyl, dodecyl, tridecyl, tetradecyl, pentadecyl, hexadecyl, heptadecyl, and octadecyl; cycloalkyl, such as cyclopentyl, cyclohexyl, and methylcyclohexyl; aryl, such as phenyl and naphthyl; alkaryl, such as tolyl and xylyl; and aralkyl, such as benzyl and phenethyl. Examples of halogen-substituted hydrocarbyl groups include, but are not limited to, 3,3,3-trifluoropropyl, 3-chloropropyl, chlorophenyl, and dichlorophenyl. The composition and molar quantity of side groups is chosen such that the refractive index of the resulting polymer creates a nanoparticle/polymer composite with minimal light scattering loss.

The nanoparticle portion of the hybrid material can consist of any dispersible nanoparticle with an average particle size less one-tenth the shortest wavelength of interest for the optical device being fabricated. For example, for transmission of 800-1000 nm wavelengths the particles should have a dispersed size of less than 80 nm. Preferably the nanoparticle comprises silica including fused silica, fumed silica, colloidal silica, titania, silicon, or other nano-sized material all of which may be treated or untreated with surface treatments. Examples of surface treatments include organic and silicon based materials for improving the dispersibility and stability of the polymer/nanoparticle system. In a preferred aspect, fused silica having a particle size of less than 80 nanometers in size may be utilized by the present invention.

As outlined above, the nanoparticle and polymer should be compatible to avoid scattering of light when the two components are combined. Preferably, the polymer and nanoparticles should have refractive indices close to one another. Preferably, the refractive index of the polymer is within 0.03 of that of the nanoparticle. For example, utilizing a nanoparticle of fused silica, a refractive index of 1.45 at 850 nanometers is given. Therefore, the index of refraction of the polymer should preferably range between 1.48 and 1.42.

The polymer/nanoparticle hybrid material should also have preferred thixotropic properties to allow for formation of waveguides utilizing a process which will be described in more detail below. Specifically, the polymer/nanoparticle hybrid material should have a tan delta, or $G''/G'$, that is less than one at a measurement frequency of $1\ sec^{-1}$. This allows for the formation of adjacent waveguides while maintaining separation between the waveguides before the polymer layers are cured.

In a preferred aspect of the present invention, the fabrication of the waveguide structure is easily scaled to large area applications common within the printed wiring board industry. Preferably a fabrication technique that meets the scalability requirement for printed wiring board applications is screen or stencil printing of polymer materials. Screen printing is a well developed technique for simultaneously depositing and patterning polymer materials for electronic and display applications. However, this technique has not been developed for use in waveguide fabrication processes.

Figure 2:
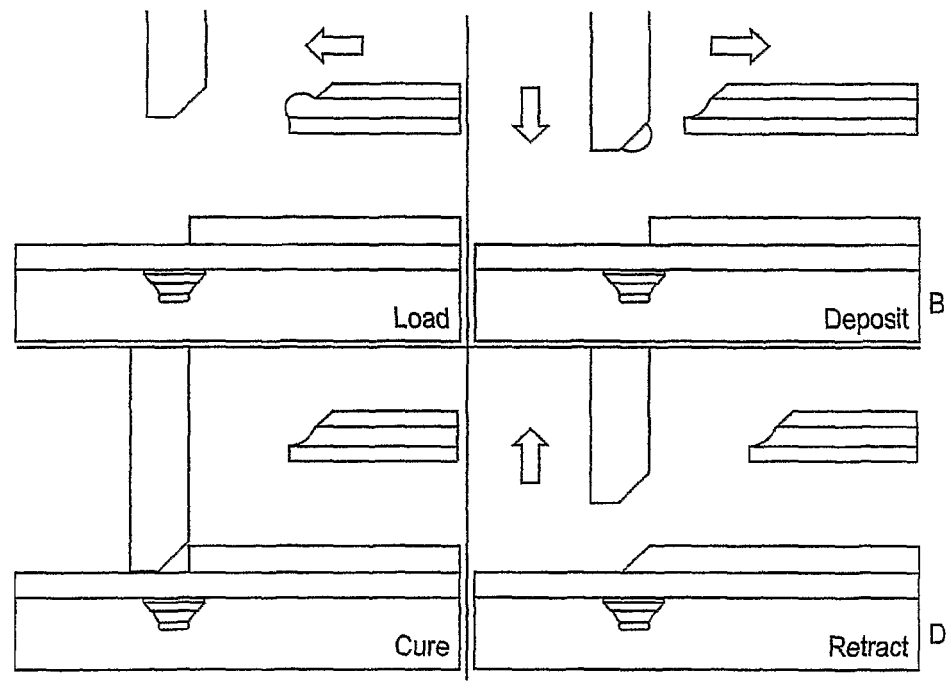
FIG. 2 is a graphical representation of the steps of forming the out of plane mirror of the waveguide of the present invention.
Figure 3:
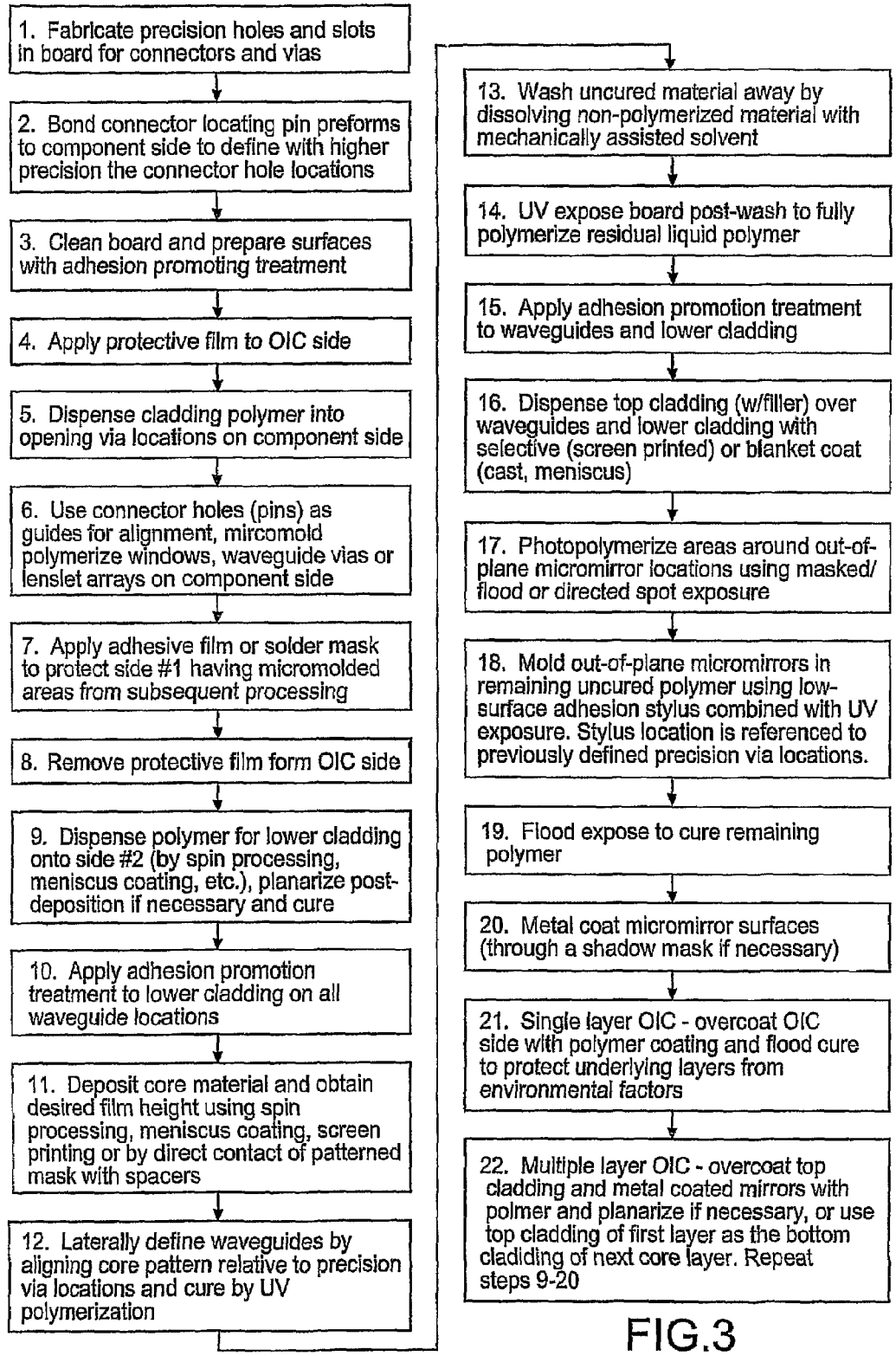
FIG. 3 is a block diagram of a process of forming a waveguide and printed circuit board of the present invention.

Referring to FIG. 3, there is shown a block diagram listing the steps of a preferred process according to the present invention. In a first step, holes are formed in the printed wiring board (PWB) for connectors and vias. In step 2 connector pin preforms are bonded to the electrical side of the PWB; thereby, defining the connector hole locations. Step 3 includes cleaning the PWB with an appropriate agent and applying an adhesion promoter to the electrical and optical surfaces to aid in the application of subsequent polymer layers. Step 4 includes the application of a protective layer to the optical surface. Step 5 includes applying a cladding polymer layer into the open vias on the electrical surface of the PWB. Step 6 includes micromolding and polymerizing windows, vias or lenslet arrays on the electrical surface of the PWB using the connector pins bonded in step 2 as reference locations. Step 7 includes applying an adhesive film or solder mask to the PWB to protect the electrical surface of the PWB from subsequent processing steps. Step 8 includes removing the protective film from the optical surface of the PWB. Step 9 includes applying a lower cladding layer onto the optical surface. The lower cladding layer may be spin coated, meniscus coated, dip coated, curtain coated or screen printed. The lower cladding layer may be planarized following application of the lower cladding layer and then cured. The lower cladding may be coated onto an adhesive-backed film, then laminated to the board. The lower cladding layer can comprise polymers such as, organic and inorganic materials with preferred materials including inorganic siloxane based polymers having the properties previously outlined above. Step 10 includes an optional application of an adhesion promoting treatment to the lower cladding layer corresponding to waveguide locations on the PWB. Step 11 includes depositing the core polymer layer to obtain a desired film height. The core polymer layer may be applied by spin coating, meniscus coating, curtain coating or preferably screen printing. Additionally the core polymer layer may deposited by direct contact of a patterned mask with spacers. Step 12 includes laterally defining the waveguides by aligning the core pattern relative to the via locations, and then curing of the core polymer layer, preferably by UV curing. Step 13 includes washing uncured polymer from the core layer using a mechanically assisted solvent, as-needed with photolithography or other alternatives to screen or stencil printing. Step 14 includes exposing the PWB to UV light to fully polymerize any remaining core polymer material. Step 15 includes application of an adhesion promoting treatment to the lower cladding layer and waveguides. Step 16 includes applying a top cladding layer including a filler over the waveguides and lower cladding layer. The top cladding layer may be applied using a blanket coating technique such as meniscus coating, curtain coating or casting, but preferably the top cladding layer is selectively screen printed. The top cladding layer can comprise polymers such as, organic and inorganic materials with preferred materials including inorganic siloxane based polymers having the properties previously outlined above. In step 17 the areas in proximity to but not including the out of plane mirror locations are cured and polymerized using UV curing by application of flood, masked or directed spot exposure of UV light. Step 18 includes molding of the out of plane mirrors in the uncured top cladding layer using a low adhesion stylus or fiber tip. Referring to FIG. 2, there is shown a graphical diagram of the steps for forming the out of plane mirrors. The mirrors are preferably formed using a micro molding process in combination with ultraviolet curing of the polymer system. As can be seen in FIG. 2, the out of plane mirror fabrication process includes four basic steps. In step A, a small amount of the core polymer material is applied to a fiber tip that has been polished at 45°. The fiber tip is typically 100 microns or larger. The fiber tip having a flat surface preferably oriented at 45 degrees allows transference of the angle to the polymer forming the out of plane mirror of the present invention. Also, the fiber tip guides the UV curing light to the position on the surface of the substrate where the out of plane mirror is to be placed. In a preferred aspect, the fiber only cures the polymer within a few microns of the out of plane mirror being formed allowing other out of plane mirrors to be formed sequentially in a step and repeat process. In the first step A, the polymer may also be deposited by screen or stencil printing removing the need to load polymer onto the tip of the fiber in Step A. In step B, the fiber is located over the position where the out of plane mirror is to be fabricated and the polymer is deposited relative to the core polymer layer. In steps C and D, the polymer is cured to form the out of plane mirror integral with the core polymer layer and then the fiber is removed or retracted in step D. This process has been demonstrated to produce out of plane mirrors having less than 0.1 dB of loss per mirror surface.

Figure 6:
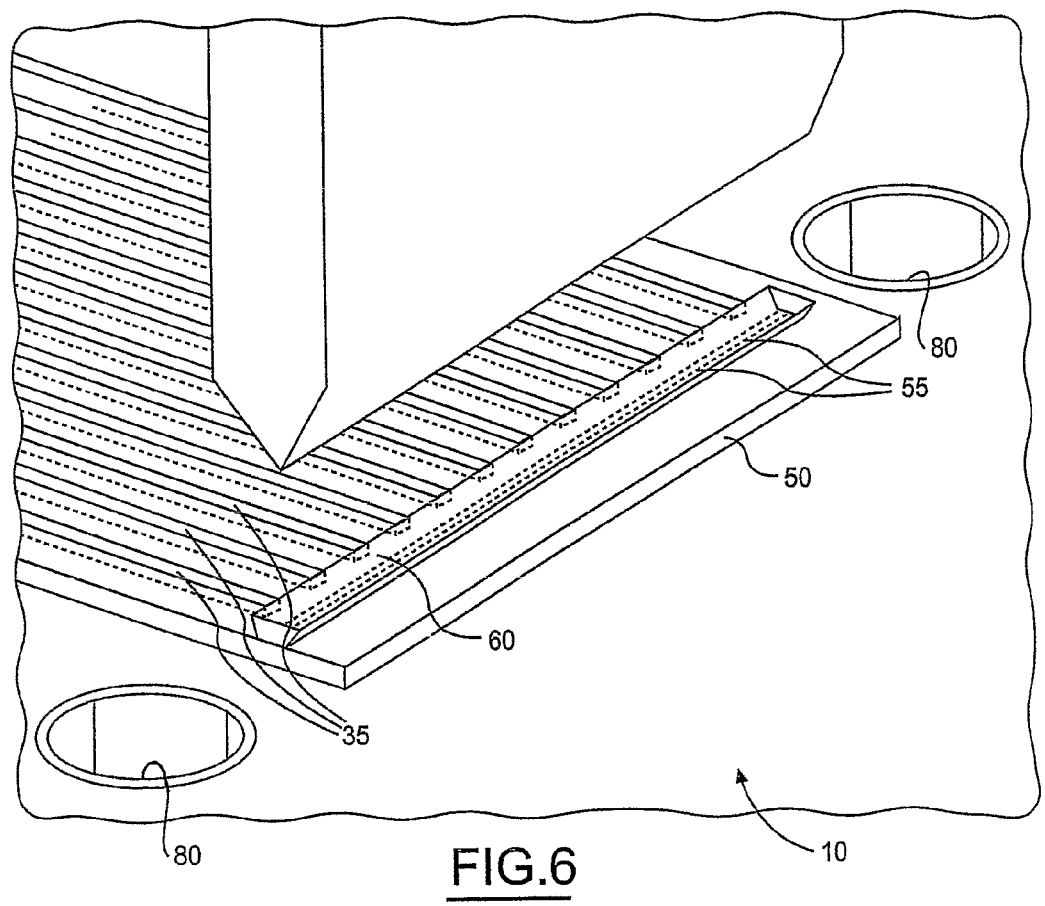
FIG. 6 is a graphical representation of an out of plane mirror surface formed on an array of 12 waveguides using a broad stylus, in accordance with the present invention.

In an alternative embodiment depicted in FIG. 6, the loading step of step A can be omitted in which case the out of plane mirror would be formed in the top cladding layer as well as the core polymer layer. Specifically, after the top cladding layer has been applied, the fiber tip may be applied to the top cladding layer and core layer with subsequent curing as in steps C and D outlined above.

In step 19 the PWB is flood exposed with UV light to cure any remaining polymer material. Step 20 includes metal coating the out of plane mirrors. The metal may be applied using a shadow mask or may be applied by sputtercoating aluminum or by electro-less metal deposition. In step 21 an overcoat is applied to the optical surface of the PWB with subsequent curing to protect the underlying layers from environmental damage. If the PWB is to have multiple optical interconnecting layers, then an over coating layer is applied to the top cladding layer and the metal coated out of plane mirrors, with subsequent curing, as detailed in step 22. Additionally the over coating may be planarized prior to curing. Alternatively, the top cladding layer of a first of the multiple layers may be utilized as the lower cladding layer of the next core layer. Steps 9 through 20 are then repeated to form the next optical interconnecting layer.

The invention has been described in an illustrative manner, and it is to be understood that the terminology that has been used is intended to be in a nature of description rather than limitation.

Many modifications and variations of the present invention are possible in light of the above teachings. It is therefore, to be understood that within the scope of the appended claims, the invention may be practiced other than as specifically described.

What is claimed is:

1. An optical link comprising:
    a substrate capable of supporting optical and electronic elements and circuits;
    a polymer waveguide having a top cladding layer, a core siloxane polymer layer, and a bottom cladding layer, the core siloxane polymer layer, or top and bottom cladding layers, or both, comprising a polymer material having a nanoparticle filler, wherein the polymer waveguide is formed using a printing process and the core siloxane polymer layer has an index of refraction from about 0.5% to about 5% greater than the top cladding layer and the bottom cladding layer;
    mirrors for directing light transmitted by the polymer waveguide into the optical and electronic elements or another polymer waveguide; and
    vias for allowing optical transmission through the substrate and layers.

2. The optical link of claim 1 wherein the nanoparticle filler is of a size, distribution and refractive index that combine to support optical transmission and minimize loss through scattering or absorption, and wherein the size is less than one tenth the shortest wavelength of interest for the optical link.

3. The optical link of claim 1 wherein the waveguide has a thickness of up to 100 microns.

4. The optical link of claim 1 wherein the core siloxane polymer layer, or top and bottom cladding layers, or both, has a tan delta of less than one at a measurement frequency of 1 sec^−1.

5. The optical link of claim 1 wherein the top and bottom cladding layers comprise a siloxane polymer.

6. The optical link of claim 1 wherein the core siloxane polymer layer comprises a siloxane polymer having functional groups selected from the group consisting of epoxy, vinylether, vinylester, vinyl, olephenic, and acrylates.

7. The optical link of claim 6 wherein the siloxane polymer is UV curable.

8. The optical link of claim 7 wherein the siloxane polymer comprises a cationic photo curable polymer.

9. The optical link of claim 8 wherein the siloxane polymer comprises a siloxane copolymer having a photo cleavable acid.

10. The optical link of claim 7 wherein the siloxane polymer comprises a free radical photo curable polymer.

11. The optical link of claim 10 wherein the free radical photo curable polymer is selected from the group consisting of acrylic, methacrylic, sulfide, vinyl keto, vinyl acetate and unsaturated polyimide based polymers.

12. The optical link of claim 1 wherein the core siloxane polymer layer comprises a thermally curable polymer.

13. The optical link of claim 12 wherein the siloxane polymer comprises at least one organopolysiloxane having an average of at least two reactive functional groups per molecule, a number-average molecular weight of up to 80,000, and an average from 0 to 90 mol % of silicon-bonded phenyl groups per molecule.

14. The optical link of claim 1 wherein the nanoparticle is selected from the group consisting of fused silica, fumed silica, colloidal silica, titania, and silicon.

15. The optical link of claim 14 wherein the nanoparticle filler comprises silica.

16. The optical link of claim 1 wherein the waveguide includes mirrors formed at opposing ends of the waveguide and wherein the mirrors are integrally formed with the waveguide.

17. The optical link of claim 16 wherein the mirrors comprise total internal reflection surfaces.

18. The optical link of claim 1 wherein the optical link includes a plurality of waveguides.

19. The optical link of claim 18 wherein the optical link comprises a multilayer structure having a plurality of waveguides.

20. A process for producing an optical link comprising forming a polymer waveguide having an upper cladding layer, a core polymer layer, and a lower cladding layer, the core polymer layer, or upper and lower cladding layers, or both, comprising a polymer material having a nanoparticle filler with a particle size of less than one tenth the shortest wavelength of interest for the optical link using a printing process wherein forming the polymer waveguide includes the steps of:

1) forming holes in a printed wiring board for connectors, components and vias;
2) bonding connector pin preforms to an electrical side of the printed wiring board;
3) cleaning the printed wiring board with an appropriate agent and applying optionally an adhesion promoting treatment to the electrical and optical surfaces of the printed wiring board;
4) applying a protective layer to the optical surface;
5) applying a cladding polymer layer into the open vias on the electrical surface of the printed wiring board;
6) micro-molding and polymerizing windows, vias or lenslet arrays on the electrical surface of the printed wiring board;
7) applying an adhesive film or solder mask to the printed wiring board to protect the electrical surface from subsequent processing steps;
8) removing the protective film from the optical surface of the printed wiring board;
9) applying a lower cladding layer onto the optical surface;
10) applying an adhesion promoting treatment to the lower cladding layer;
11) depositing the core polymer layer to obtain a desired film height;
12) laterally defining the waveguides by aligning a core polymer pattern relative to the via locations and then curing the core polymer layer;
13) washing uncured polymer as-needed from the core polymer layer using a mechanically assisted solvent;
14) exposing the printed wiring board to UV light to fully polymerize any remaining core polymer material;
15) applying an adhesion promoting treatment to the lower cladding layer and waveguides;
16) applying a top cladding layer including a filler over the waveguides and lower cladding layer;
17) curing areas in proximity to the mirror locations;
18) molding out of plane mirrors in the uncured top cladding layer using a low adhesion stylus or fiber tip;
19) curing the printed wiring board by flood exposure with UV light to cure any remaining polymer material;
20) metal coating the mirrors surfaces;
21) applying an overcoat to the optical surface of the printed wiring board with subsequent curing to protect the underlying layers from environmental damage.

21. The process of claim 20 wherein the printing process comprises a screen printing process.

22. The process of claim 20 including the step of utilizing the top cladding layer of a first of the multiple layers as the lower cladding layer of the next core layer and thereafter repeating steps 9 through 20.

23. The process of claim 20 wherein the step of molding out of plane mirrors prior to depositing the top cladding comprises the steps of:

a) applying a small amount of the core polymer material to the fiber tip that has been polished at 45°;
b) locating the fiber tip over a position where the out of plane mirror is to be fabricated and depositing the polymer;
c) curing the deposited polymer to form the out of plane mirror integral with the core polymer layer;
d) removing the fiber tip.

24. The process of claim 23 wherein the step of applying a small amount of the core polymer material to the fiber tip is omitted and the fiber tip is applied to uncured areas of the top cladding polymer layer deposited over the cured core layer.

25. The process of claim 23 wherein the polymerization of the mirror facet is localized by delivery of UV light through, and confinement by, the molding stylus using total internal reflection or reflective inner surfaces.

26. The process of claim 24 wherein the polymerization of the mirror facet is localized by delivery of UV light through, and confinement by, the molding stylus using total internal reflection or reflective inner surfaces.

27. The process of claim 23 wherein an array of waveguides with ends aligned along one or more axes is faceted with mirrors simultaneously using a broad stylus with single or multiple molding surfaces.

28. The process of claim 24 wherein an array of waveguides with ends aligned along one or more axes is faceted with mirrors simultaneously using a broad stylus with single or multiple molding surfaces.

29. The optical link of claim 1 further comprising a protective polymer coating formed on a bottom surface of the polymer waveguide for shielding the polymer waveguide from external magnetic sources and damage due to contact.

* * * * *